United States Patent [19]

Miller, deceased

[11] 3,843,796

[45] Oct. 22, 1974

[54] ANTIHYPERTENSIVE AGENTS

[75] Inventor: Charles S. Miller, deceased, late of Norristown, Pa. by Ruth A. Miller, administrator

[73] Assignee: Merck & Co., Inc., Rahway, N.J.

[22] Filed: Apr. 26, 1971

[21] Appl. No.: 137,631

[52] U.S. Cl. ........ 424/273, 260/309, 260/326.14 T, 260/326.47, 260/471 C, 260/519, 424/274, 424/300, 424/319

[51] Int. Cl. .......................................... A61k 27/00

[58] Field of Search .......... 424/308, 311, 320, 300, 424/324, 330, 274, 273, 319; 260/326.47, 471 C, 309, 519, 326.14 T

[56] References Cited
UNITED STATES PATENTS 2,047,144  7/1936  Kharasch ........................... 424/330

FOREIGN PATENTS OR APPLICATIONS 1,141,606  1/1969  Great Britain ..................... 424/330

OTHER PUBLICATIONS

Chemical Abstracts, Vol. 52, (1958), 12232–12233.

*Primary Examiner*—Albert T. Meyers
*Assistant Examiner*—Frederick E. Waddell

[57]  ABSTRACT

N-($\alpha$-Aminoacyl)- and N-($\alpha$-acylaminoacyl) derivatives of $\alpha$-(1-aminoethyl)-m-hydroxybenzyl alcohol and $\alpha$-(1-aminoethyl)-m-benzyloxybenzyl alcohol are disclosed and the processes for preparing such novel compounds are described. These compounds are used as antihypertensive agents.

6 Claims, No Drawings

ANTIHYPERTENSIVE AGENTS

BACKGROUND OF THE INVENTION

Metaraminol [(−)erythro-α-(1-aminoethyl)-m-hydroxybenzyl alcohol (αR,1S configuration)] has been reported to be an effective antihypertensive agent in man. It is believed that metaraminol produces its antihypertensive effects by depleting sympathetic nerves of norepinephrine and replacing the natural transmitter. Further, it is known that the rapid release of norepinephrine causes transient hypertension and an increase in heart rate.

SUMMARY OF THE INVENTION

This invention provides a novel class of compounds and methods for their preparation. These novel compounds are N-(α-aminoacyl) and N-(α-acylaminoacyl) derivatives of the stereochemical forms of α-(1-aminoethyl)-m-hydroxybenzyl alcohol and α-(1-aminoethyl)-m-benzyloxybenzyl alcohol. This invention also contemplates the N-(α-aminoacyl) and N-(α-acylaminoacyl) derivatives of α-(1-aminoethyl)-m-benzyloxybenzyl alcohols, having nuclear substituents in the benzene ring of the benzyloxy group.

The compounds of this invention are designed to act as substrates for the various hydrolytic enzymes such as trypsin, chymotrypsin, carboxypeptidases, aminopeptidases, pepsin, cathepsins and the like. The action of these enzymes on the compounds of this invention results in the release of the parent aminoalcohol.

This invention further provides a novel method of treating hypertension in humans and therapeutic compositions of substituted and unsubstituted N-(α-aminoacyl) and N-(α-acylaminoacyl) derivatives of metaraminol. These compounds have antihypertensive activity, but are free from undesirable acute cardiovascular side effects.

DESCRIPTION AND PREFERRED EMBODIMENTS

It is believed that the mode of action of α-(1-aminoethyl)-m-hydroxybenzyl alcohol in producing anti-hypertensive effects is liberation of the natural transmitter, norepinephrine, and its replacement by a substitute transmitter. The rate of release of norepinephrine, however, may be rapid, thus causing transient hypertension and an increase in heart rate. If this rapid release of norepinephrine is moderated, the undesirable side effects that presently limit the general use of α-(1-aminoethyl)-m-hydroxybenzyl alcohols in the treatment of hypertension, would be overcome while the desired therapeutic action would be maintained.

It has been found that the compounds of this invention are cleaved *in vivo* to yield the parent α-(1-aminoethyl)-m-hydroxybenzyl alcohol and release norepinephrine from mouse heart tissue.

The present invention renders the desirable antihypertensive actions of the α-(1-aminoethyl)-m-hydroxybenzyl alcohols more useful since the compounds of this invention regulate the release of the pharmacologically active agent.

This invention provides a new method of treating hypertension and therapeutic compositions which comprise the administration of a compound or its pharmaceutically acceptable acid addition salts represented by the following structural formula I:

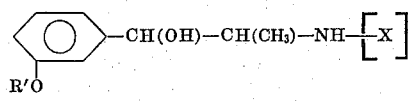

where
  [X] is an organic radical such that -NH-[X] is capable of acting as a substrate for a hydrolytic enzyme. More specifically [X] is an α-aminoacyl group of the formula

wherein $R_1$ is a radical formed by the removal of a carboxyl group from a naturally-occurring amino acid belonging to the L series or an acylated derivative of said amino acid;
where said acyl group is
  alkanoyl (preferably lower alkanoyl up to seven carbon atoms);
  aroyl (preferably benzoyl or substituted benzoyl);
  aralkanoyl (preferably phenylacetyl or substituted phenylacetyl);
  alkoxycarbonyl (preferably loweralkoxycarbonyl up to seven carbon atoms); and
  aralkoxycarbonyl (preferably benzyloxycarbonyl or substituted benzyloxycarbonyl); and
R' is hydrogen;
  alkyl (preferably lower alkyl such as methyl, ethyl, propyl, i-propyl, butyl, t-butyl, etc.);
  aralkyl (preferably arloweralkyl such as benzyl, phenethyl, etc,);
  aryl (preferably phenyl); or
  acyl (preferably acetyl, propionyl, benzoyl, phenylacetyl, etc.).

The above compounds exist as the optically active enantiomorphs of the diastereoisomeric, racemic *erythro* and *threo* forms as well as the racemic modifications.

The absolute configuration of optically active compounds described in this invention is defined by using the "sequence rule," described by Cahn, Ingold and Prelog. Experientia, 12, 81 (1956). For purposes of stereoisomer identification of the compounds of this invention, the hydroxyl-bearing carbon of the side chain is designated "α" and the nitrogen-bearing carbon is designated "one." Metaraminol, (−) *erythro*-α-(1-aminoethyl)-m-hydroxybenzyl alcohol, therefore has the configuration designated (αR,1S) under this convention.

The more preferred compounds that may be used in treating hypertension and in therapeutic compositions are those described by Formula I, which are of the *erythro* configuration.

The most preferred compounds are those of Formula I which are in the (αR,1S) configuration and where R' is hydrogen or benzyl.

This invention further describes a new class of chemical compounds and their pharmaceutically acceptable acid addition salts having a structure as in Formula II where the amino alcohol portion of the molecule is (±) *erythro* or the enantiomorph of (αR,1S) configuration, and the aminoacyl portion of the molecule, [X], is derived from a naturally-occurring amino acid of the L series or an acylated derivative of said amino acid. This may be described by the structural Formula II:

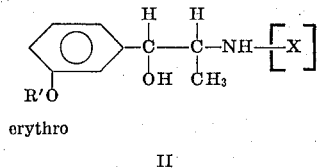

erythro

II where
R' is hydrogen;
alkyl (preferably lower alkyl such as methyl, ethyl, propyl, i-propyl, butyl, t-butyl, etc.);
aralkyl (preferably arloweralkyl such as benzyl, phenethyl, etc.);
aryl (preferably phenyl); or
acyl (preferably acetyl, propionyl, benzoyl, phenylacetyl, etc.); and
[X] is L-alanyl;
L-valyl;
L-leucyl;
L-norleucyl;
L-isoleucyl;
L-seryl;
L-threonyl;
L-cysteinyl;
L-methionyl;
L-prolyl;
L-hydroxyprolyl,
L-phenylalanyl;
L-tyrosyl;
L-tryptophyl;
L-$\alpha$-aspartyl;
L-$\alpha$-glutamyl;
L-$\beta$-hydroxy-$\alpha$-glutamyl;
L-lysyl;
L-arginyl or
L-histidyl
or an acylated derivative of these naturally-occurring aminoacyl radicals where the acyl group is
alkanoyl (preferably lower alkanoyl up to seven carbon atoms);
aroyl (preferably benzoyl or substituted benzoyl);
aralkanoyl (preferably phenylacetyl or substituted phenylacetyl);
alkoxycarbonyl (preferably loweralkoxycarbonyl up to seven carbon atoms); or
aralkoxycarbonyl (preferably benzyloxycarbonyl or substituted benzyloxycarbonyl).

The more preferred compounds of this invention are those described by Formula II where R' is hydrogen or benzyl.

Specific representative compounds of this invention include:
erythro m-benzyloxy-$\alpha$-[1-(L-leucinamido)-ethyl]-benzyl alcohol
erythro m-benzyloxy-$\alpha$-[1-(N$^2$-benzyloxycarbonyl-L-phenylalanamido)-ethyl]-benzyl alcohol
erythro m-hydroxy-$\alpha$-[1-(L-phenylalanamido)-ethyl]-benzyl alcohol
erythro m-benzyloxy-$\alpha$-[1-(N$^2$-benzoyl-L-tyrosinamido)-ethyl]-benzyl alcohol
erythro m-hydroxy-$\alpha$-[1-(N$^2$-benzoyl-N$^6$-benzyloxycarbonyl-L-lysinamido)-ethyl]-benzyl alcohol
erythro m-hydroxy-$\alpha$-[1-(N$^2$-benzoyl-L-lysinamido)-ethyl]-benzyl alcohol
erythro m-hydroxy-$\alpha$-[1-(N$^2$-benzoyl-L-tyrosinamido)-ethyl]-benzyl alcohol
erythro m-hydroxy-$\alpha$-[1-(N$^2$-acetyl-L-phenylalanamido)-ethyl]-benzyl alcohol.

Further representative compounds include the threo isomers of the above compounds.

The scope of this invention includes:
a. the compounds of Formula II;
b. the pharmaceutically acceptable acid addition salts of the compounds of Formula II;
c. the method of treating hypertension using the compounds of Formula I, and their pharmaceutically acceptable acid addition salts; and
d. the use in therapeutic compositions of the compounds of Formula I, and their pharmaceutically acceptable acid addition salts.

It is well known in the medical arts that non-toxic acid addition salts of pharmacologically active amine compounds are essentially equivalent to the free base. The salts merely provide a conveniently soluble form.

The amines of this invention may be readily converted to their non-toxic acid addition salts by customary methods in the art. The non-toxic salts of this invention are those salts the acid component of which is pharmacologically acceptable in the intended dosages; such salts would include those prepared from hydrochloric acid, sulfuric acid, phosphoric acid, methanesulfonic acid, acetic acid, maleic acid, tartaric acid, glycolic acid, lactic acid, salicylic acid, etc.

An embodiment of this invention is a method of treating hypertension in humans which comprises the administration in appropriate dosage form of between about 5 mg. and 500 mg. of a compound of this invention, preferably in divided doses, per day.

The compounds of this invention may be dispensed in a form suitable for oral use, for example, as tablets, aqueous or oil suspensions, dispersible powders or granules, emulsions, hard or soft capsules or syrups or elixirs. Compositions intended for oral use may be prepared according to any method known in the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation. Tablets contain the active ingredient in admixture with non-toxic pharmaceutically acceptable excipients which are suitable for the manufacture of tablets. These excipients may be, for example, inert diluents, for example calcium carbonate, sodium carbonate, lactose, calcium phosphate or sodium phosphate; granulating and disintegrating agents, for example, maize starch or alginic acid; binding agents, for example, starch, gelatin or acacia; and lubricating agents, for example, magnesium stearate, stearic acid or talc. The tablets may be uncoated or they may be coated by known techniques to delay disintegration and absorption in the gastro-intestinal tract and thereby provide a sustained action over a longer period.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with an oil medium, for example, arachis oil, liquid paraffin or olive oil.

The compounds of this invention may be in aqueous solution or suspension. Use of excipients suitable for aqueous suspensions may be employed if desired. These excipients are suspending agents, for example, sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example, lecithin; or condensation products of an alkylene oxide with fatty acids, for example, polyoxyethylene stearate; or condensation products of ethylene oxide with long-chain aliphatic alcohols, for example, heptadecaethyleneoxy-cetanol; or condensation products of ethylene oxide with partial esters derived from fatty acids and a hexitol, for example, polyoxyethylene sorbitol monooleate; or condensation products of ethylene oxide with partial esters derived from fatty acids and hexitol anhydrides, for example, polyoxyethylene sorbitan monooleate. The said aqueous suspensions may also contain one or more preservatives, for example, ethyl, or n-propyl, p-hydroxy benzoate, one or more coloring agents, one or more flavoring agents, and one or more sweetening agents, such as sucrose.

Oily suspensions may be formulated by suspending the active ingredient in a vegetable oil, for example, arachis oil, olive oil, sesame oil or coconut oil, or in a mineral oil, such as liquid paraffin. The oily suspensions may contain a thickening agent, for example, beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

The compounds of this invention may also be employed in the form of oil-in-water emulsions. The oily phase may be a vegetable oil, for example, olive oil or arachis oils, or a mineral oil, for example, liquid paraffin or mixtures of these. Suitable emulsifying agents may be naturally-occurring gums, for example, gum acacia or gum tragacanth; naturally-occurring phosphatides, for example, soyabean lecithin, and esters or partial esters derived from fatty acids and hexitol anhydrides, for example, sorbitan mono-oleate, and condensation products of the said partial esters with ethylene oxide, for example, polyoxyethylene sorbitan monooleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and coloring agents. The pharmaceutical compositions may be in the form of a sterile injectable preparation, for example, as a sterile injectable aqueous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example, as a solution in 1,3-butanediol.

The compounds of this invention may also be in the form of suppositories for rectal administration of the drug. These can be prepared by mixing the drug with a suitable non-irritating excipient which is solid at ordinary temperatures, but liquid at rectal temperature and will therefore melt in the rectum to release the drug. Such materials as cocoa butter and polyethylene glycols may be employed in these formulations.

Further, these compounds may be tableted or otherwise formulated so that for every 100 parts by weight of the composition, there are present between 5 and 95 parts by weight of the active ingredient, and preferably between 25 and 85 parts by weight of the active ingredient. The dosage unit form will generally contain between about 1 mg. and about 200 mg. of the active ingredient of Formula I.

From the foregoing formulation discussion, it is apparent that the compounds of this invention can be administered orally, parenterally, topically and rectally. The term parenteral as used herein includes subcutaneous injection, intravenous or intramuscular injection or infusion techniques.

The dosage regimen in carrying out the methods of this invention is that which insures maximum therapeutic response until improvement is obtained and thereafter is the minimum effective level which gives relief. Thus, in general, the dosages are those that are therapeutically effective in the treatment of hypertensive conditions or symptoms. In general, the daily dose can be between about 5 and 500 mg., bearing in mind, of course, that in selecting the appropriate dosage in any specific case, consideration must be given to the patient's weight, general health, age, and other factors which may influence response to the drug.

The compounds of this invention are prepared from the selected stereochemical form of $\alpha$-(1-aminoethyl)-m-hydroxybenzyl alcohol or $\alpha$-(1-aminoethyl-m-benzyloxybenzyl alcohol and a derivative of the desired amino acid or acylamino acid in which the necessary protecting groups have been introduced and the carboxyl has been activated by any of the methods used in peptide synthesis. Such methods are described by E. Schröder and K. Lübbe in "The Peptides," Volume 1, Academic Press, New York (1965), pages 77-125. Following formation of the amide bond, the blocking groups are removed by standard procedures.

One such procedure is as follows:

The carboxyl group of a nitrogen protected amino acid is activated by reaction with a suitable isoxazolium salt. This may be accomplished by treating the N-protected amino acid with a 3-unsubstituted isoxazolium salt in the presence of a base such as triethylamine. The reaction is carried out in a polar solvent such as anhydrous acetonitrile or nitromethane. A 1:1 molar ratio of reactants is preferred and a temperature of between 0° and 30°C. To the reaction product of the isoxazolium salt and the N-protected amino acid is added in 1:1 molar ratio, an $\alpha$-(1-aminoethyl)-m-hydroxy benzyl alcohol in which the phenolic hydroxyl may be protected by a suitable blocking group. Reaction is carried out between 0° and 30°C., preferably at room temperature. The time may vary from a few minutes to a few days. The product may be isolated by any appropriate procedure, such as, evaporating the solvent from the reaction mixture and chromatographing, triturating or extracting the residue. The nitrogen protective group of the aminoacyl portion of the molecule and the phenol protective group may then be removed if desired.

The activating agent employed may be one of several 3-unsubstituted isoxazolium salts. N-Ethyl-5-phenylisoxazolium-3'-sulfonate is typical of the reagents used.

It is preferred that the above reaction be carried out on an acylated derivative of the amino acid. Such acyl group should be one that is easily removed if desired. It is preferred that the acyl group be alkanoyl, such as acetyl;
aroyl, such as benzoyl;
aralkanoyl, such as phenylacetyl;
alkoxycarbonyl, such as methoxycarbonyl; or
aralkoxycarbonyl, such as benzyloxycarbonyl.

It is also preferred that the above reaction be carried out on an 0-substituted phenethanolamine derivative if the 0-substituted product is desired. If the desired product is the phenol, then the preferred starting material should be one where the phenol blocking group is easily removed. For example, a benzyl group which may be removed by catalytic hydrogenolysis. Alternatively, the free phenol may be used.

When the amino acid used is one that contains one or more groups that may interfere in the above reaction, these groups should be protected. Thus, for example, a hydroxyl group may be protected with a benzyl group which, in turn, may be removed when the reaction has been completed. A carboxylic acid may be protected by forming an ester which may be readily hydrolyzed.

The following are detailed examples which show the preparation of the compounds of this invention. These examples are representative and should not be construed to be a limitation of this invention.

EXAMPLE 1

($\alpha$R,1S)-*erythro* m-Benzyloxy-$\alpha$-[1-(L-leucinamido)-ethyl]-benzyl alcohol Hydrochloride N-Ethyl-5-phenylisoxazolium-3'-sulfonate (5.04 g., 0.02 mole) is suspended in 35 ml. of anhydrous acetonitrile under anhydrous conditions. With cooling and stirring, a solution of tertiary butoxycarbonyl-L-leucine (4.61 g., 0.0199 mole) and triethylamine (2 g., 0.02 mole) in 35 ml. of anhydrous acetonitrile is added over a period of 40 minutes. The cooling bath is removed and the mixture allowed to stir for 4 hours. A solution of ($\alpha$R,1S)-*erythro*-$\alpha$-(1-aminoethyl)-m-benzyloxybenzyl alcohol (5.12 g., 0.02 mole) in 40 ml. of anhydrous acetonitrile is then added dropwise. The mixture is allowed to stir for 15 hours, the solvent is removed under reduced pressure, and the residue is dissolved in methylene chloride and washed 5 times with water. The methylene chloride phase is dried over magnesium sulfate, filtered, and the solvent evaporated under reduced pressure. The residue is dissolved in a minimum of methylene chloride and chromatographed on a silica gel (Stahl HF$_{254}$) column developed with a 90/10 benzene-ethyl alcohol mixture to obtain ($\alpha$R,1S-)-*erythro*-m-benzyloxy-$\alpha$-[(N-tertiary butoxycarbonyl-L-leucinamido)-ethyl]-benzyl alcohol. This material (8 g.) is dissolved in trifluoroacetic acid (29 ml.) with cooling. Carbon dioxide is evolved and the mixture is allowed to stand at room temperature for 1 hour. Excess trifluoroacetic acid is removed under reduced pressure. The residue is dissolved in ethyl ether, ethyl alcohol (10 ml.) is added, followed by alcoholic hydrochloric acid (7 ml. of a 3.1 molar solution). Slow dilution of the mixture with petroleum ether gives white crystals. They are dissolved in ethyl alcohol, diluted with a little benzene, filtered through a charcoal pad and the filtrate diluted slowly with petroleum ether. The precipitated product is recrystallized repeatedly from ethyl alcohol and ethyl ether to give ($\alpha$R,1S)-*erythro*-m-benzyloxy-$\alpha$-[1-(L-leucinamido)-ethyl]-benzyl alcohol hydrochloride.

| | |
|---|---|
| Anal. Calcd. for $C_{22}H_{31}ClN_2O_3$: | C, 64.93; H, 7.68; Cl, 8.71; N, 6.89. |
| Found: | C, 65.30; H, 7.56; Cl, 8.59; N, 6.99. |

EXAMPLE 2

($\alpha$R,1S)-*erythro*-m-Benzyloxy-$\alpha$-[1-(N$^2$-benzyloxycarbonyl-L-phenylalanamido)-ethyl]-benzyl alcohol N-Ethyl-5-phenylisoxazolium-3'-sulfonate (4.23 g., 0.017 mole) is suspended in anhydrous acetonitrile (30 ml.) under anhydrous conditions. With cooling and stirring, a solution of N-benzyloxycarbonyl-L-phenylalanine (5 g., 0.017 mole) and triethylamine (1.69 g., 0.017 mole) in anhydrous acetonitrile (30 ml.) is added. The cooling bath is removed and a solution of ($\alpha$R,1S)-*erythro*-$\alpha$-(1-aminoethyl)-m-benzyloxybenzyl alcohol (4.30 g., 0.017 mole) in anhydrous acetonitrile (30 ml.) is added dropwise and the mixture is allowed to stir for 3 days after adding more acetonitrile. The solid is filtered, dried, ground, and washed by suspension in 0.1 N hydrochloric acid, then in water, filtered and dried. The solid is recrystallized from methyl alcohol to give ($\alpha$R,1S)-*erythro*-m-benzyloxy-$\alpha$-[1-(N$^2$-benzyloxycarbonyl-L-phenylalanamido)-ethyl]-benzyl alcohol, m.p. 182°–3°.

| | |
|---|---|
| Anal. Calcd. for $C_{33}H_{34}N_2O_5$: | C, 73.58; H, 6.36; N, 5.20. |
| Found: | C, 73.88; H, 6.30; N, 5.12. |

EXAMPLE 3

($\alpha$R,1S)-*erythro*-m-Hydroxy-$\alpha$-[1-(L-phenylalanamido)-ethyl]-benzyl alcohol Hydrochloride ($\alpha$R,1S)-*erythro-m-Benzyloxy*-$\alpha$-[1-(N$^2$-benzyloxycarbonyl-L-phenylalanamido)-ethyl]-benzyl alcohol (5.47 g., 0.01 mole) is dissolved in 210 ml. of a 20 percent methyl alcohol-tetrahydrofuran mixture and subjected to hydrogenation in the presence of 10 percent Pd/C (3 g.) at an initial pressure of 28 p.s.i. After 5-½ hours, the catalyst is filtered and the solvents evaporated under reduced pressure to give 3.3 g. of a white friable glass. The residue is dissolved in ethyl alcohol and filtered through a charcoal pad (acid washed "Norit.") Alcoholic hydrochloric acid (5 ml. of a 3.17 molar solution) is added to the filtrate and the solution is diluted to 500 ml. with ethyl ether and chilled to yield 3.4 g. solid. The material is further purified by dissolving in ethyl alcohol, treating with charcoal and diluting the filtrate with ethyl ether to obtain ($\alpha$R,1S)-*erythro*-m-hydroxy-$\alpha$-[1-(L-phenylalanamido)-ethyl]-benzyl alcohol hydrochloride.

| | |
|---|---|
| Anal. Calcd. for $C_{18}H_{23}ClN_2O_3$: | C, 61.62; H, 6.61; Cl, 10.11; N, 7.99. |
| Found: | C, 61.34; H, 6.59; Cl, 10.28; N, 8.05. |

EXAMPLE 4

($\alpha$R,1S)-*erythro*-m-Benzyloxy-$\alpha$-[1-($N^2$-benzoyl-L-tyrosinamido)-ethyl]-benzyl alcohol N-Ethyl-5-phenylisoxazolium-3'-sulfonate (5.04 g., 0.02 mole) is suspended in anhydrous acetonitrile (35 ml.). With cooling and stirring, a solution of N-benzoyl-L-tyrosine (5.68 g., 0.02 mole) and triethylamine (2 g., 0.02 mole) in anhydrous acetonitrile (55 ml.) is added dropwise. The cooling bath is removed and stirring continued for 1-¾ hours at which time solution is complete. A solution of ($\alpha$R,1S)-*erythro*-$\alpha$-(1-aminoethyl)-m-benzyloxybenzyl alcohol (5.12 g., 0.02 mole) in anhydrous acetonitrile (35 ml.) is added dropwise and the mixture is allowed to stir for 3 days. The solid which separates is filtered and washed with water. The dried solid is dissolved in a 10 percent ethyl alcohol-benzene mixture and filtered through a thick silicic acid pad (Stahl HF254). The pad is washed repeatedly with fresh solvent. This process is repeated twice more and the material is precipitated three times from an ethyl alcohol-benzene mixture by adding petroleum ether slowly to yield 2.83 g., which is dried at 100°C. under vacuum for 56 hours to obtain ($\alpha$R,1S)-*erythro*-m-benzyloxy-$\alpha$-[1-($N^2$-benzoyl-L-tyrosinamido)-ethyl]-benzyl alcohol.

| | |
|---|---|
| Anal. Calcd. for: $C_{32}H_{32}N_2O_5$: | C, 73.26; H, 6.15; N, 5.34. |
| Found: | C, 72.86; H, 6.07; N, 5.26. |

EXAMPLE 5

($\alpha$R,1S)-*erythro*-m-Hydroxy-$\alpha$-[1-($N^2$-L-lysinamido)-ethyl]-benzyl alcohol Hydrochloride A. ($\alpha$R,1S)-erythro-m-Hydroxy-$\alpha$-[1-($N^2$-benzoyl-$N^6$-benzyloxycarbonyl-L-lysinamido)-ethyl]-benzyl alcohol N-Ethyl-5-phenylisoxazolium-3'-sulfonate (2.53 g., 0.01 mole) is suspended in anhydrous acetonitrile (18 ml.). With ice-water bath cooling and stirring, a solution of $N^2$-benzoyl-$N^6$-benzyloxycarbonyl-L-lysine (3.84 g., 0.01 mole) and triethylamine (1.01 g., 0.01 mole) in anhydrous acetonitrile (18 ml.) and anhydrous tetrahydrofuran (20 ml.) is added dropwise over 50 minutes. The ice-water bath is removed and the mixture allowed to stir for 2-½ hours. A solution of ($\alpha$R,1S)-*erythro*-$\alpha$-(1-aminoethyl)-m-hydroxybenzyl alcohol (1.67 g., 0.01 mole) in anhydrous tetrahydrofuran (50 ml.) is added dropwise at room temperature and the mixture is allowed to stir overnight. The solvents are removed under reduced pressure at a temperature less than 50° and the residue is dissolved in ethyl acetate. The ethyl acetate solution is extracted ten times with water, once with 0.1 N hydrochloric acid and then five times with water before drying over magnesium sulfate. After filtration, the solvent is evaporated to give 4.2 g. of a glassy residue which is purified by chromatography on a silicic acid column using benzene(90 parts)-dioxan(25 parts)-acetic acid(4 parts) to obtain ($\alpha$R,1S-)-*erythro*-m-hydroxy-$\alpha$-[1-($N^2$-benzoyl-$N^6$-benzyloxycarbonyl-L-lysinamido)-ethyl]-benzyl alcohol.

B. ($\alpha$R,1S)-erythro-m-Hydroxy-$\alpha$-[1-($N^2$-benzoyl-L-lysinamido)-ethyl]-benzyl alcohol Hydrochloride ($\alpha$R,1S)-erythro-m-Hydroxy-$\alpha$-[1-($N^2$-benzoyl-$N^6$-benzyloxycarbonyl-L-lysinamido)-ethyl]-benzyl alcohol (2.5 g., 0.005 mole) is dissolved in methyl alcohol (100 ml.) and is subjected to hydrogenation in the presence of 10 percent palladium-on-carbon (1 g.) at an initial pressure of 33.6 p.s.i. for 27 hours. The catalyst is removed and the solvent is evaporated under reduced pressure to leave a white friable solid (1.38 g.). The solid is dissolved in a minimum of ethyl alcohol and alcoholic hydrochloric acid (2 ml. of a 3.17 molar solution) is added. The mixture is then diluted with ethyl ether to yield a gum that solidifies after trituration with ethyl ether. Repeated recrystallization from an ethyl alcohol-benzene mixture gives ($\alpha$R,1S)-*erythro*-m-hydroxy-$\alpha$-[1-($N^2$-benzoyl-L-lysinamido)-ethyl]-benzyl alcohol hydrochloride.

| | |
|---|---|
| Anal. Calcd. for: $C_{22}H_{30}ClN_3O_4 \cdot 1/2H_2O$: | C, 59.38; H, 7.02; N, 9.44; Cl, 7.97. |
| Found: | C, 59.50; H, 7.22; N, 9.22; Cl, 7.96. |

EXAMPLE 6

($\alpha$R,1S)-*erythro*-m-Hydroxy-$\alpha$-[1-($N^2$-benzoyl-L-tyrosinamido)-ethyl]-benzyl alcohol N-Ethyl-5-phenylisoxazolium-3'-sulfonate is suspended in 54 ml. of anhydrous acetonitrile. With ice-water bath cooling and stirring, a solution of N-benzoyl-L-tyrosine (8.55 g., 0.03 mole) and triethylamine (3.03 g., 0.03 mole) in 54 ml. of anhydrous acetonitrile is added dropwise over 40 minutes. The ice-water bath is removed and the stirring is continued for 2-½ hours. A solution of ($\alpha$R,1S)-*erythro*-$\alpha$-(1-aminoethyl)-m-hydroxybenzyl alcohol (5 g., 0.03 mole) in 150 ml. of anhydrous tetrahydrofuran is added dropwise at room temperature and the stirring is continued for 18 hours. The solvents are removed under reduced pressure and the residue is treated with 350 ml. of ethyl acetate and 300 ml. of water. The ethyl acetate phase is extracted with fourteen 300 ml. portions of water and dried over magnesium sulfate. After filtering and evaporating the solvent, 9.73 g. of glassy solid remains. The material is dissolved in hot 50 percent isopropyl alcohol-benzene and filtered through a silicic acid pad. The pad is washed with the same hot solvent which is then filtered through a charcoal pad (acid washed "Norit.") This process is repeated several times. After recovery of the material by evaporation of the solvent, it is dissolved in 50 percent ethyl acetate-benzene and, with stirring, concentrated on a water-bath with occasional addition of benzene until the ethyl acetate is almost all removed. The oil that separates is recovered by decantation after cooling. Repetition of this process followed by repeated addition of an ethyl acetate solution of the material to a large volume (ca. 1,500 ml.) of boiling benzene and recovering the precipitated oil on cooling gives (αR,1S)-*erythro*-m-hydroxy-α-[1-(N²-benzoyl-L-tyrosinamido)-ethyl]-benzyl alcohol, (m.p. 117°-123°C.).

| Anal. Calcd. for: $C_{25}H_{26}N_2O_5$: | C, 69.11; H, 6.03; N, 6.45. |
|---|---|
| Found: | C, 69.05; H, 6.06; N, 6.35. |

EXAMPLE 7

(αR,1S)-*erythro*-m-Hydroxy-α-[1-(N²-acetyl-L-phenylalanamido)-ethyl]-benzyl alcohol A solution of dicyclohexylcarbodiimide (1.13 g., 0.006 mole) in 7.5 ml. anhydrous tetrahydrofuran is added in small portions with stirring to a solution of N-acetyl-L-phenylalanine (0.76 g., 0.0037 mole) and (αR,1S)-*erythro*-α-(1-aminoethyl)-m-hydroxybenzyl alcohol (0.57 g., 0.0034 mole) in 37 ml. of anhydrous tetrahydrofuran and 15 ml. of anhydrous ethyl alcohol at room temperature. A small amount of gelatinous precipitate forms that soon re-dissolves on continued stirring. After allowing the reaction mixture to stand overnight at room temperature, 200 mg. of acetic acid and 50 mg. of water are added to destroy any excess cyclohexylcarbodiimide. The solvents are evaporated under reduced pressure and the residue is extracted repeatedly with warm water. The combined water extracts are evaporated under reduced pressure to leave 1.29 g. of a glassy residue that is dissolved in ethyl acetate. The solution is washed successively with 0.1 N hydrochloric acid, water, dilute sodium bicarbonate solution and water, dried over magnesium sulfate, filtered and the solvent evaporated to leave a glassy solid. The material is dissolved in a minimum of ethyl acetate and absorbed into the end of a 2-½ cm. × 10 cm. silicic acid chromatobar and developed (descending) with a 90 percent benzene-10 percent ethyl alcohol mixture. After extracting the product from the column with ethyl acetate, it is placed on another chromatobar and developed as above to obtain (αR,1S)-*erythro*-m-hydroxy-α-[1-(N²-acetyl-L-phenylalanamido)-ethyl]-benzyl alcohol.

| Anal. Calcd. for: $C_{20}H_{24}N_2O_4$: | C, 67.39, H, 6.79; N, 7.86. |
|---|---|
| Found: | C, 66.75; H, 6.86; N, 7.77. |

Examples 8–32

When the procedures of Examples 1–7 are followed but the appropriate starting material is substituted, then the following compounds are prepared. These compounds are representative of the products of this invention.

| Ex. | Product | Starting Material | Procedure |
|---|---|---|---|
| 8 | (αR,1S)-erythro-m-benzyloxy-α-[1-(L-isoleucinamido)-ethyl]-benzyl alcohol | N-tertiarybutoxycarbonyl-L-isoleucine | Example 1 |
| 9 | (αR,1S)-erythro-m-benzyloxy-α-[1-(L-threonamido)-ethyl]-benzyl alcohol | N-tertiarybutoxycarbonyl-L-threonine | Example 1 |
| 10 | (αR,1S)-erythro-m-benzyloxy-α-[1-(L-cysteinamido)-ethyl]-benzyl alcohol | N-tertiarybutoxycarbonyl-L-cysteine | Example 1 |
| 11 | (αR,1S)-erythro-m-benzyloxy-α-[1-(L-alanamido)-ethyl]-benzyl alcohol | N-tertiarybutoxycarbonyl-L-alanine | Example 1 |
| 12 | erythro-m-ethoxy-α-[1-(L-leucinamido)-ethyl]-benzyl alcohol | erythro-α-(1-aminoethyl)-m-ethoxybenzyl alcohol | Example 1 |
| 13 | (α-R,1S)-erythro-m-benzyl-oxy-α-[1-(N²-propionyl-L-alanamido)ethyl]-benzyl alcohol | N-propionyl-L-alanine | Example 2 |
| 14 | (αR,1S)-erythro-m-benzyloxy-α-[1-(N²-benzoyl-L-valamido)-ethyl]-benzyl alcohol | N-benzoyl-L-valine | Example 2 |
| 15 | (αR,1S)-erythro-m-benzyloxy α-[-N²-phenylacetyl-L-norleucinamido)-ethyl]-benzyl alcohol | N-phenylacetyl-L-norleucine | Example 2 |
| 16 | (αR,1S)-erthro-m-benzyloxy-α-[1-(N²-ethoxycarbonyl-L-seramido)-ethyl]-benzyl alcohol | N-ethoxycarbonyl-L-serine | Example 2 |
| 17 | (αR,1S)-erythro-m-benzyloxy α-[1-(N²-benzyloxycarbonyl-L-prolamido)-ethyl]-benzyl alcohol | N-benzyloxycarbonyl-L-proline | Example 2 |
| 18 | (αR,1S)-erythro-m-hydroxy-α-[1-(N²-i-propionyl-L-alanamido)-ethyl]-benzyl alcohol | (αR,1S)-erythro-m-benzyloxy-α-[1-(N²-propionyl-L-alanamido)-ethyl]-benzyl alcohol | Example 3 |
| 19 | (αR,1S)-erythro-m-hydroxy-α-[1-(N²-benzoyl-L-valamido)-ethyl]-benzyl alcohol | (αR,1S)-erythro-m-benzyloxy-α-[1-(N²-benzoyl-L-valamido)-ethyl]-benzyl alcohol | Example 3 |
| 20 | (αR,1S)-erythro-m-hydroxy-α-[1-N²-phenylacetyl-L-norleucinamido)-ethyl]-benzyl alcohol | (αR,1S)-erythro-m-benzyloxy-α-[1-(N²-phenylacetyl-L-norleucinamido)-ethyl]-benzyl alcohol | Example 3 |
| 21 | (αR,1S)-erythro-m-hydroxy-α-[1-(N²-ethoxycarbonyl-L-seramido)-ethyl]-benzyl alcohol | (αR,1S)erythro-m-benzyloxy-α-[1-(N²-ethoxycarbonyl-L-seramido)-ethyl]-benzyl alcohol | Example 3 |
| 22 | (αR,1S)-erythro-m-hydroxy-α-[1-(L-prolamido)-ethyl]-benzyl alcohol | (αR,1S)-erythro-m-benzyloxy-α-[1-(N²-benzyloxycarbonyl-L-prolamido)-ethyl]-benzyl alcohol | Example 3 |
| 23 | (αR,1S)-erythro-m-benzyloxy-α-[1-(N²-benzoyl-L-hydroxy-prolamido)-ethyl]-benzyl alcohol | N-benzoyl-L-hydroxyproline | Example 4 |

Examples 8-32 —Continued

When the procedures of Examples 1-7 are followed but the appropriate starting material is substituted, then the following compounds are prepared. These compounds are representative of the products of this invention.

| Ex. | Product | Starting Material | Procedure |
|---|---|---|---|
| 24 | (αR,1S)-erythro-m-benzyloxy-α-[1-(N²-benzoyl-L-seramido)-ethyl]-benzyl alcohol | N-benzoyl-L-serine | Example 4 |
| 25 | (αR,1S)-erythro-m-benzyloxy α-[1-(N²-benzoyl-L-threonine)-ethyl]-benzyl alcohol | N-benzoyl-L-threonine | Example 4 |
| 26 | (αR,1S)-erythro-m-hydroxy-α-[1-(N²-benzoyl-L-hydroxy-prolamido)-ethyl]-benzyl alcohol | N-benzoyl-L-hydroxyproline | Example 6 |
| 27 | (αR,1S)-erythro-m-hydroxy-α-[1-(N²-acetyl-L-alanamido)-ethyl]-benayl alcohol | N-acetyl-L-alanine | Example 7 |
| 28 | (αR,1S)-erythro-m-hydroxy-α-[1-(N²-benzoyl-L-trypto phanamido)-ethyl]-benzyl alcohol | N-benzoyl-L-tryptophan | Example 7 |
| 29 | (αR,1S)-erythro-m-hydroxy-α-[1-(N²-acetyl-L-histidamido)-ethyl]-benzyl alcohol | N-acetyl-L-histidine | Example 7 |
| 30 | (αR,1S)-erythro-m-benzyloxy-α-[1-(N²-benzoyl-N⁶-benzyloxycarbonyl-L-lysinamido)-ethyl]-benzyl alcohol | erythro-α-(1-aminoethyl-m-benzyloxyyenzyl alcohol | Example 5, Part A |
| 31 | (αR,1S)-erythro-m-hydroxy-α-[1-(N²-benzoyl-N⁵-benzyloxycarbonyl-N-(benzyloxycarbonylamidino)-L-ornithamido)-ethyl]-benzyl alcohol | N²-benzoyl-N⁵-benzyloxycarbonyl-N⁵-(benzyloxycarbonylamidino)-L-ornithine | Example 5, Part A |
| 32 | (αR,1S)-erythro-m-hydroxy-α-[1-(N²-benzoyl-L-argin amido)-ethyl]-benzyl alcohol | (αR,1S)-erythro-m-hydroxy-α-[1-(N²-benzoyl-N⁵-benzyloxycarbonyl-N⁵-benzyloxycarbonylamidino)-L-ornithamido)-ethyl]-benzyl alcohol | Example 5 |

We claim:

1. The method of treating hypertension in a human which comprises the administration to a hypertensive human of a hypotensive amount of a compound of the formula

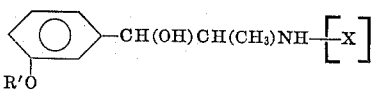

where
[X] is
L-alanyl,
L-valyl,
L-leucyl,
L-norleucyl,
L-isoleucyl,
L-seryl,
L-threonyl,
L-cysteinyl,
L-methionyl,
L-prolyl,
L-hydroxyprolyl,
L-phenylalanyl,
L-tyrosyl,
L-tryptophyl,
L-α-aspartyl,
L-α-glutamyl,
L-β-hydroxy-α-glutamyl,
L-lysyl,
L-arginyl or
L-histidyl,
or an N-acylated derivative of these naturally-occurring amino acid radicals where said N-acyl group is lower alkanoyl,
benzoyl,
phenyl lower alkanoyl,
lower alkoxy carbonyl or
benzyloxycarbonyl; and
R' is
hydrogen or benzyl.

2. The method according to claim 1 in which the parent α-(1-aminoethyl)-m-hydroxybenzyl alcohol is of the (±) erythro configuration.

3. The method according to claim 1 in which the parent α-(1-aminoethyl)-m-hydroxybenzyl alcohol is of the (−) erythro configuration.

4. The pharmaceutical preparation in dosage unit form adapted for administration to obtain relief from hypertension comprising per dosage unit, a pharmaceutical acceptable excipient and an effective hypotensive non-toxic amount within the range of from about 1 to 100 mg. of at least one compound of the formula

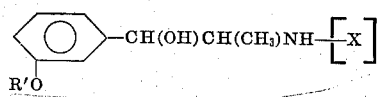

where
[X] is
L-alanyl,
L-valyl,
L-leucyl,
L-norleucyl,
L-isoleucyl,

L-seryl,
L-threonyl,
L-cysteinyl,
L-methionyl,
L-prolyl,
L-hydroxyprolyl,
L-phenylalanyl,
L-tyrosyl,
L-tryptophyl,
L-α-aspartyl,
L-α-glutamyl,
L-β-hydroxy-α-glutamyl,
L-lysyl,
L-arginyl or
L-histidyl or an N-acylated derivative of these naturally-occurring amino acid radicals where said N-acyl group is
- lower alkanoyl,
- benzoyl,
- phenyl lower alkanoyl,
- lower alkoxy carbonyl or
- benzyloxycarbonyl; and R' is
- hydrogen or benzyl.

5. The pharmaceutical preparation according to claim 4 in which the parent α-(1-aminoethyl)-m-hydroxybenzyl alcohol is of the *erythro* configuration.

6. The pharmaceutical preparation according to claim 4 in which the percent α-(1-aminoethyl)-m-hydroxybenzyl alcohol is of the (−) *erythro* or (αR,1S) configuration.

* * * * *